Figure 1:
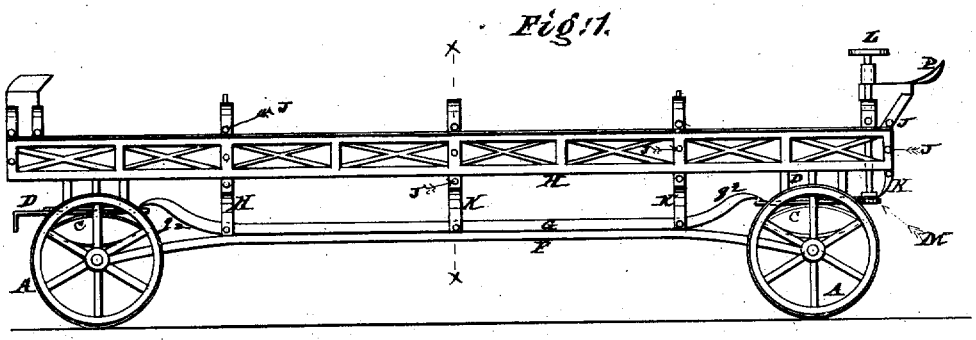

J. SCHMIDLAPP.

HOOK AND LADDER TRUCK.

No. 7,520. Reissued Feb. 20, 1877.

Witnesses
J. M. Buckley
Charles L. Barrick

Inventor
Jacob Schmidlapp

N. PETERS, PHOTO-LITHOGRAPHER, WASHINGTON, D. C.

UNITED STATES PATENT OFFICE.

JACOB SCHMIDLAPP, OF NEW YORK, N. Y.

IMPROVEMENT IN HOOK-AND-LADDER TRUCKS.

Specification forming part of Letters Patent No. 97,969, dated December 14, 1869; reissue No. 7,520, dated February 20, 1877; application filed December 14, 1876.

*To all whom it may concern:*

Be it known that I, JACOB SCHMIDLAPP, of the city, county, and State of New York, have invented an Improvement in Hook-and Ladder Trucks, of which the following is a specification:

The object of my invention is to make a hook-and-ladder truck that combines lightness, with great strength, and at the same time of a chaste or graceful design of construction; and the nature of my improvements consists in strengthening the side rails of the truck frame by making it bridge-fashion—that is, having the string-pieces of the frame braced by a trestle-work lengthwise, or by suitable braces connected together by stay-rods, and with the string-pieces of the frame, whereby the truck-frame is enabled to afford a firm support to the load of hooks and ladders carried thereon. Also, as an additional means of strengthening the truck-frame and reach, connecting the front and hind wheels together, securing, by suitable means, one or more braces to the under side of the string-piece or side rail of the frame and to the reach, for the purpose of making the braced side rails of the frame help to strengthen the reach, and the stiffness of the reach help to strengthen the frame, and at the same time support the truck-frame, in its elevated position, steadily upon the center of the trucks. Also, in the manner of constructing the reach in two parts, with the ends forked or branching, so that one of the branches may extend below the axle-tree to brace and hold the lower end of the king-bolt solidly in a vertical position, while the other branch is attached to the upper part of the circle-plate, secured to the under side of truck-body, the object being to leave ample space between the two ends of the reach for the elliptic springs to pass between them when turning the truck, and at the same time hold the axles firmly in connection with the frame, notwithstanding the topheaviness of its load, and elevated position above the wheels. Also, in combination with the truck-frame, the permanently-fixed steering-seat, elevated above the ladders, so as to permit their withdrawal without unshipping the pilot's seat, or compelling him to vacate the truck when dropping the ladders at a fire. Also, in combination with the truck-frame, and permanently fixed and elevated pilot's seat, the detachable steering-wheel spindle, so that by withdrawing the spindle from its socket the ladders may be withdrawn from the frame without any delay of time, or extra labor to the pilot, or displacement from his seat.

But, to describe my invention more particularly, I will refer to the accompanying drawings, forming a part of this specification, the same letters of reference, wherever they occur, referring to similar parts.

Figure 2:
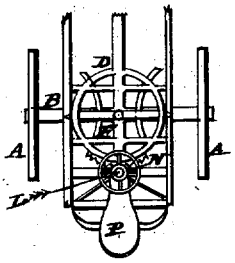
Figure 3:
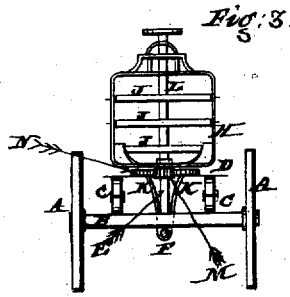
Figure 4:
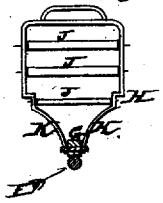

Figure 1 is a side elevation of the truck or carriage. Fig. 2 is a plan view of the steering end of the truck. Fig. 3 is an end elevation of the same. Fig. 4 is a transverse cut section of the truck through the line *x x*, Fig. 1.

Letter A represents the wheels of the truck; B, the axles; C, the elliptic springs for supporting the truck-frame; D, the circle-plate for the axles to turn on; and E the king-bolt for connecting the fore and hind axles, and wheels thereon, to the truck-frame. As these several parts are common to all hook-and-ladder trucks, it is not deemed necessary to go into any particular description of them.

Letters F and G represent the reach for connecting the fore and hind wheels together. The part F is an iron rod or bar, the ends of which are secured to the king-bolts at the lower side of the axles, while the upper part G has its ends bent up, as shown at $g^2$, Fig. 1, so as to form a solid and secure connection with the circle-plate secured to the under side of the truck-body, and thus leave ample space between the ends of the reach for the elliptic springs to pass between them when turning the truck.

It will be obvious that, as the ends of the lower part of the reach are bent down from the horizontal line of the middle of the reach, so as to connect with the king-bolt below the axles, they act as braces to support the upper or body part of the reach, which holds the wheels fore and aft rigidly at a fixed distance apart.

The lower part F, though extending the entire length of the body part G of the reach, is not an absolute necessity, because the beneficial effect aimed at is the bracing up of the body part of the reach. Therefore, the part F of the reach between the points of its junction with the body part G, when bolted solidly thereto, adds nothing to the accomplishment of the object aimed at, to wit, bracing up the body part of the reach, and, consequently, might be dispensed with as mere surplusage of material, if the body part of the reach be increased in strength.

Letter H represents the truck-frame, the side rails or string-pieces made bridge-fashion—that is, the side rails are braced or strengthened lengthwise by a trestle-work composed of stay rods and braces, whereby the frame is prevented from breaking down at its middle part under the heavy loads of hooks and ladders it is required to carry.

In making the truck-frame wood, or angle, or plate, or tubular iron may be used. Letters J represent a number of cross-bars between the side rails, upon which friction-rollers are secured. These cross-bars are arranged one above the other, and of sufficient space apart to admit of inserting the hooks and ladders between them, the shortest ladders between the lower set of rollers, so as to be out of the way of the horses, and the longest ladders between the upper set of rollers, and thus be above them. Letters K represent three, or more or less number of braces, secured, by bolts or other suitable means, to the body of the reach, and, at their upper ends, to the string-pieces of the truck-frame. By this means the string-pieces or side rails of the truck-frame are supported by the braced-up or arch-shaped ends of the reach, and the reach stiffened and strengthened by the trussed or trestle work of the string-pieces of the frame, each, therefore, giving support to the other by means of their connection with each other by the braces aforesaid. Letter L represents the spindle of the steering-wheel, the lower end of which is made so that it will fit into a pinion-wheel, M, which gears into a segmental toothed plate, N, secured to the circle-plate D, so that, by operating the spindle, the truck may be turned or steered at the pleasure of the pilot occupying the seat P. This spindle is made detachable from the pinion-wheel M, so that the pilot may, without vacating his seat, withdraw it from the truck-frame to permit the ladders being unshipped from the truck without delay when reaching the place of the fire.

To enable the pilot to withdraw the steering-wheel spindle, as aforesaid, and without risk of being thrown from his seat in consequence of the elevated position of his seat and vibration of the truck-frame, the seat is made a solid fixture to the truck-frame, and so elevated above the ladders as to be entirely out of their way when withdrawing the ladders from the truck, and thus avoiding all necessity of the pilot vacating his seat when dropping ladders at a fire, as would be the case if the seat was not a solid fixture to the frame, and elevated above the ladders. Another advantage aimed at by the elevation of the pilot-seat above the ladders, as set forth, is that it enables the pilot to withdraw the steering-wheel spindle with great ease and dispatch. If the pilot-seat was a loose fixture, or was adjusted on the side rails of the truck-frame, the withdrawal of the spindle from between the spokes or rounds of the ladders, to allow of their being dropped at fires, would be attended with considerable delay, as well as labor.

Having now described my invention, I will proceed to set forth what I claim and desire to secure by Letters Patent of the United States—

1. In a hook-and-ladder truck-frame, the string-pieces or side rails thereof made bridge-fashion or trussed, in combination with the ladder-supports or cross-bars J, constructed and arranged substantially as and for the purposes set forth.

2. The braces K, as a means of transmitting the strength or stiffness of the truck-frame to the reach, and the strength and stiffness of the reach to the frame, substantially as described.

3. In a hook-and-ladder truck, the reach constructed with forked or branching ends F and G, whereby the branch F, by its downward-bent shape beyond its junction with the horizontal line of the body of the reach G becomes a brace, as and for the purposes set forth.

4. In a hook-and-ladder truck, the combination of the braces K with a reach constructed with forked or branching ends, F and G, substantially as and for the purposes described.

5. In combination with a hook-and-ladder truck-frame, the permanently-fixed pilot-seat P attached thereto and at an elevated position above the ladders, substantially as described.

6. The combination of the adjustable steering-wheel spindle L, with a hook-and-ladder truck-frame, having a permanently-fixed pilot-seat, P, attached thereto, and elevated above the ladders, as and for the purposes set forth.

JACOB SCHMIDLAPP.

Witnesses:
J. W. BUCKLEY,
CHARLES L. BARRITT.